(12) United States Patent
Casco-Arias et al.

(10) Patent No.: US 7,530,097 B2
(45) Date of Patent: May 5, 2009

(54) METHODS, SYSTEMS, AND COMPUTER PROGRAM PRODUCTS THAT CENTRALLY MANAGE PASSWORD POLICIES

(75) Inventors: Luis Benici Casco-Arias, Austin, TX (US); Pratik Gupta, Cary, NC (US); David Gerard Kuehr-McLaren, Apex, NC (US); Andrew David Record, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 690 days.

(21) Appl. No.: 10/454,848

(22) Filed: Jun. 5, 2003

(65) Prior Publication Data

US 2004/0250141 A1   Dec. 9, 2004

(51) Int. Cl.
*G06F 21/00* (2006.01)
(52) U.S. Cl. .......................................... 726/6; 713/183
(58) Field of Classification Search ........................ None
See application file for complete search history.

(56) References Cited

U.S. PATENT DOCUMENTS

| | | | | |
|---|---|---|---|---|
| 5,719,941 A | * | 2/1998 | Swift et al. | 713/155 |
| 5,809,230 A | * | 9/1998 | Pereira | 726/35 |
| 5,832,211 A | * | 11/1998 | Blakley et al. | 726/6 |
| 5,838,903 A | * | 11/1998 | Blakely et al. | 726/5 |
| 5,862,323 A | | 1/1999 | Blakley, III et al. | |
| 2002/0078386 A1 | * | 6/2002 | Bones et al. | 726/3 |
| 2002/0194508 A1 | * | 12/2002 | Sanchez et al. | 726/3 |
| 2003/0177388 A1 | * | 9/2003 | Botz et al. | 713/201 |
| 2005/0027713 A1 | * | 2/2005 | Cameron et al. | 707/100 |

FOREIGN PATENT DOCUMENTS

JP      60164859 A      8/1985

* cited by examiner

*Primary Examiner*—Gilberto Barron, Jr.
*Assistant Examiner*—Abdulhakim Nobahar
(74) *Attorney, Agent, or Firm*—Stevens & Showalter, L.L.P.

(57) ABSTRACT

A method of controlling password changes in a system having a plurality of data processing systems having separate password registries. Contents of passwords in the password registries of the data processing systems are controlled using password content policies that are centrally shared between the plurality of data processing systems.

18 Claims, 3 Drawing Sheets

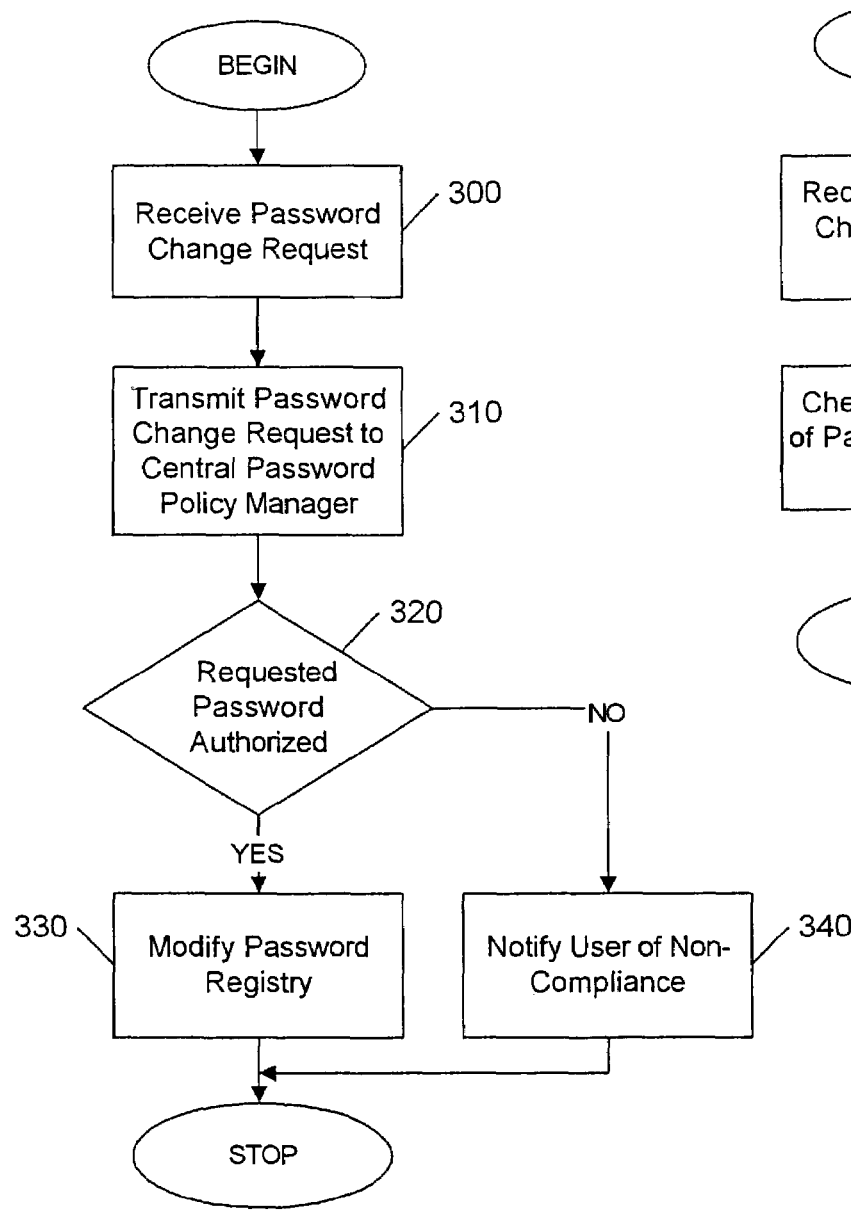

METHODS, SYSTEMS, AND COMPUTER PROGRAM PRODUCTS THAT CENTRALLY MANAGE PASSWORD POLICIES

FIELD OF THE INVENTION

This invention relates generally to data processing systems and, more particularly, to management of passwords among a plurality of data processing systems in a data processing system.

BACKGROUND OF THE INVENTION

Computer networks are well known in the art and continue to grow in size and complexity. This growth is fueled by more computers being connected to networks and connecting networks to other networks to create a distributed computing environment. Distributed computing environments can contain computers from different manufacturers and/or computers having different operating systems and applications. Differences between the networked computers can create unique operational requirements for a user.

For example, a user generally must provide a secret password to log onto a local computer that is on a network. The local computer checks the entered password against a password registry to confirm the identity and authorization of the user. Once the user logs onto the local computer, the local computer may regulate access to files and other resources based upon the user's identity.

In some distributed computing environments, for example, hundreds of users may access files on tens or hundreds of computers. Each of these computers may contain a password registry so that users must log onto each local computer using a password that is consistent with the local password registry. When differences exist between the local password registries on different computers, the user may need to remember many different passwords.

SUMMARY OF THE INVENTION

Some embodiments of the present invention provide password management systems and methods that control password changes in a system having a plurality of data processing systems that have separate password registries. Contents of passwords in the password registries of the data processing systems are controlled using password content policies that are centrally shared between the plurality of data processing systems.

A password that is requested by a password change request from one of the data processing systems may be validated using the shared password content policies to provide authorization of the password change request to the respective one of the data processing systems. A password change request may also cause propagation of a changed password to multiple ones of the data processing systems when the requested password complies with the shared password content policies.

Accordingly, passwords may be centrally managed according to shared password policies. Central management of passwords may provide more uniform levels of password strength among the data processing systems and may allow a user to request and/or change passwords in a more consistent manner irrespective or differences between the computers, software, and/or applications of the data processing systems.

BRIEF DESCRIPTION OF THE DRAWINGS

FIG. 3 is a flowchart that illustrates operations for changing passwords in a data processing system according to embodiments of the present invention.

FIG. 4 is a flowchart that illustrates operations for central management of password policies according to embodiments of the present invention.

DETAILED DESCRIPTION

Figure 1:
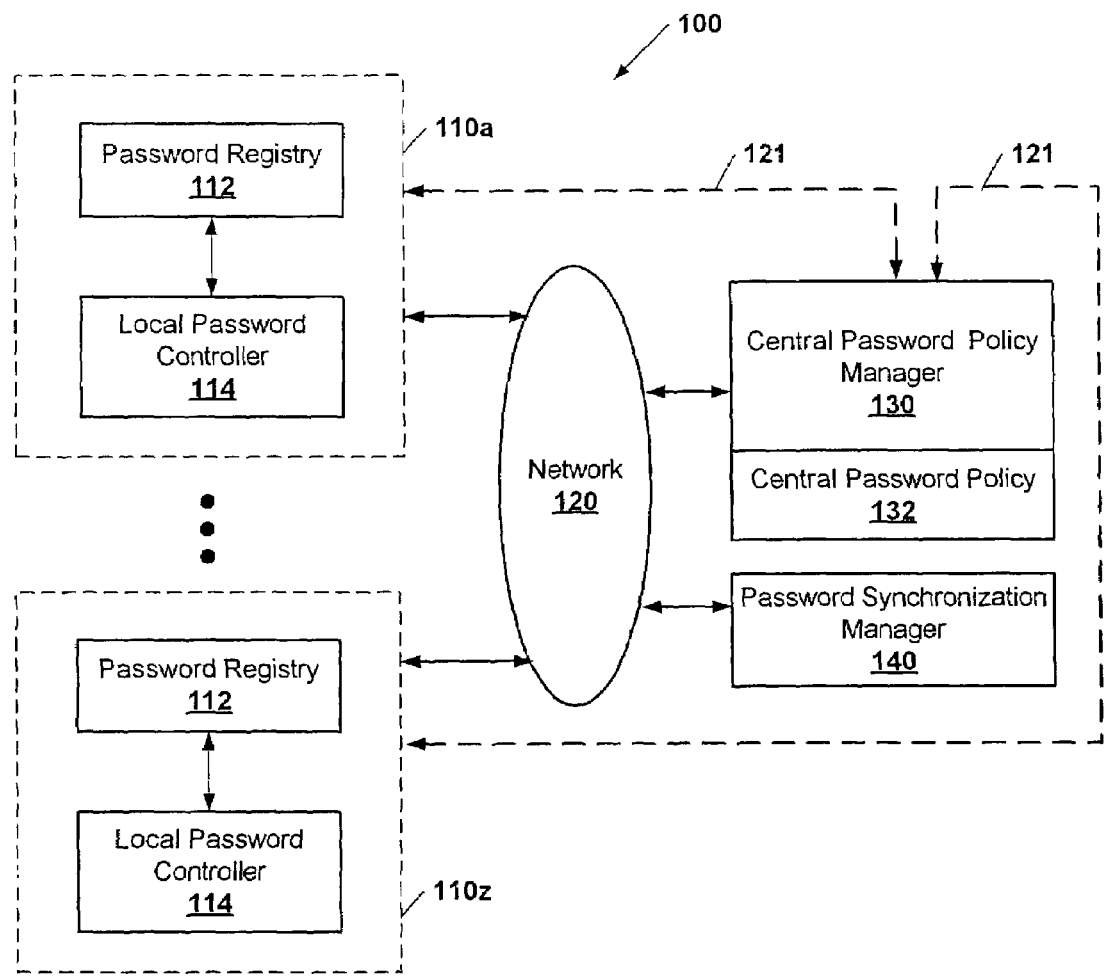
FIG. 1 is a block diagram of a password management system according to embodiments of the present invention.

The present invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numerals refer to like elements throughout.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (QWAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 illustrates a password management system 100 according to some embodiments of the present invention that may be used with a plurality of data processing systems 110a-z that are interconnected, for example, by one or more networks 120 and/or by direct connections 121. The network 120 may be, for example, a wired and/or wireless local area network and/or wide area network. Each of the data processing systems 110a-z may include one or more computers, peripherals, storage devices, and/or other resources. The password management system 100 may include a plurality of local password controllers 114, a plurality of password registries 112, and a central password policy manager 130. The password management system 100 may further include a password synchronization manager 140.

Each of the data processing systems 110a-z may include a local password controller 114 and a password registry 112. The password registry 112 may store user identification codes and associated passwords. The user identification codes and/or the passwords may be encrypted. When a user attempts to log onto one of the data processing systems 110a-z by, for example, entering a user identification code and a password, the entered information may be compared by the local password controller 114 to the password registry 112 to confirm the identity and associated authorization of the user to use the data processing system.

A password change request may be provided to the password controller 114 to request modification of a password that is stored in the password registry 112. The password change request may include, for example, a current password and a requested new password. The password change request is transmitted to the central password policy manager 130. The central password policy manager 130 checks compliance of the password change request with a central password content policy 132 and generates an indication of the compliance based on application of the policies to the requested change.

The central password content policy 132 may define system-wide policy rules for the allowable content of passwords. For example, the central password content policy 132 may include rules for minimum and/or maximum password strength, such as a minimum and/or maximum password length and/or format of passwords (e.g., combination of alphabetic and numeric characters, and/or randomness of characters). In further examples, the central password content policy 132 may include rules that define how often a password may be modified and/or may define a maximum number of password change requests that may be made within a predetermined amount of time from one or more the data processing systems (110a-z). The central password content policy 132 may be within the central password policy manager 130 or may be at least partially separate therefrom. Moreover, the central password content policy 132 and/or the central password policy manager 130 may be within one of the data processing systems 110a-z or within a separate resource, such as a server, connected to the network 120. The central password policy manager 130 may check the compliance of a password change request by comparing the strength of the password change request to one or more password strength rules in the central password content policy 132.

The central password policy manager 130 transmits the password compliance indication to the password controller 114 in the data processing system that originated the password change request. The password controller 114 modifies a password in the password registry 112 based on the password compliance indication. For example, when the password change request complies with the central password content policy, as indicated by the password compliance indication, the password controller 114 may substitute a requested password for a user's current password in the password registry 112. In contrast, a user's current password may not be changed when the password change request does not comply with the central password content policy, and the user may be notified by, for example, a message displayed to the user of the non-compliance of the password change request.

The central password policy manager 130 may inform a data processing system of at least some of the rules in the central password content policy 132. The data processing system may then display the rules to a user. For example, the central password policy manager 130 may transmit password content policy rules to a data processing system in response to receiving a password change request, so that a user may be informed of the rules for choosing a password. In another example, the central password policy manager 130 may transmit the password content policy rules in response to checking the compliance of a password change request with the central password content policy 132. Accordingly, a user who is requesting a password change may be informed of the central password policies when, for example, a password change request does not comply with the central password policies.

The password synchronization manager 140 may propagate a password change request that has been authorized by the central password policy manager 130 to multiple ones of the data processing systems 110a-z. Accordingly, the password registry 112 of the data processing systems 110a-z may be at least partially synchronized. Synchronization may allow a user to use the same password on the synchronized data processing systems 110a-z.

Figure 2:
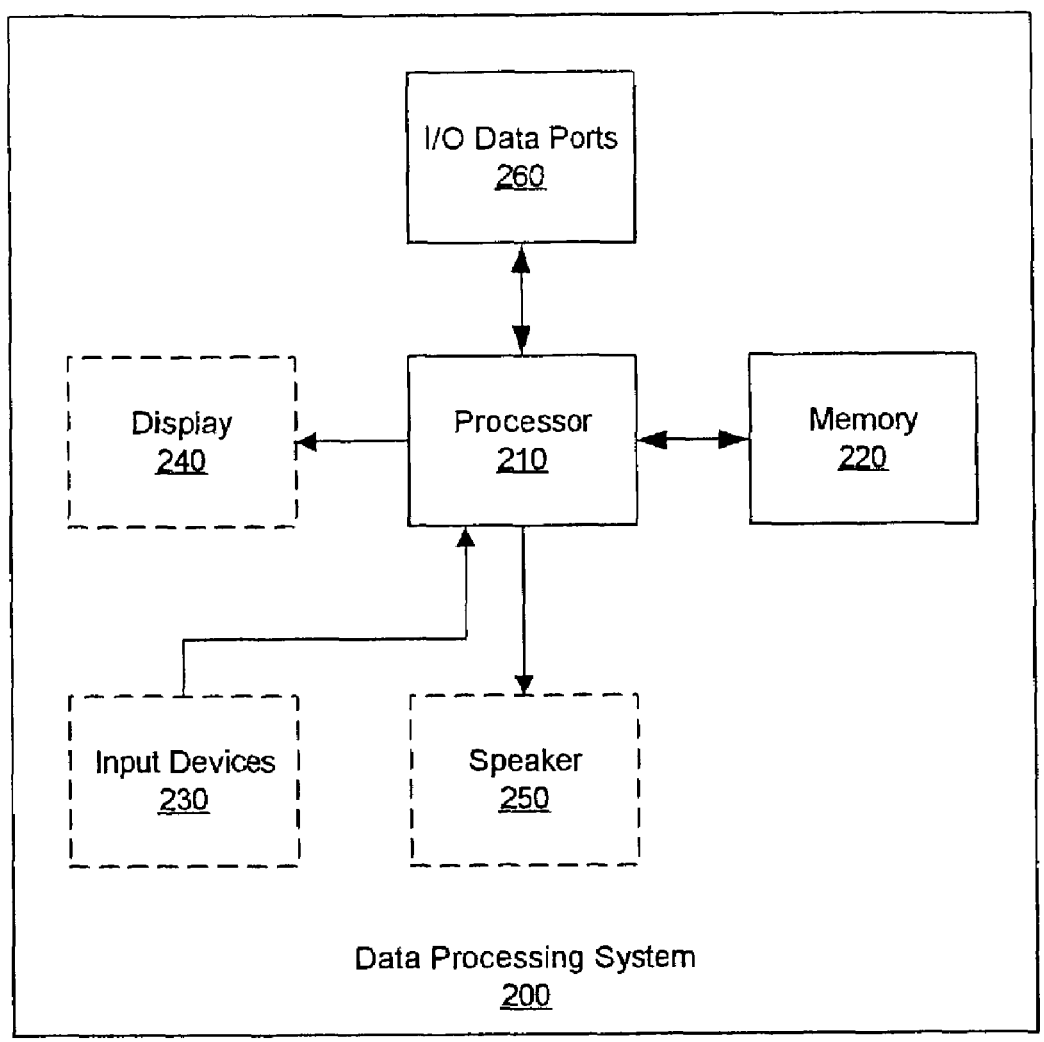
FIG. 2 is a block diagram of a data processing system according to embodiments of the present invention.

FIG. 2 illustrates an exemplary embodiment of a data processing system 200 suitable for providing a password management system, such as the local password controller 114, the password registry 112, the central password policy manager 130, the central password policy 132, and/or the password synchronization manager 140 in accordance with embodiments of the present invention. The data processing system 200 typically includes a processor 210 that communicates with a memory 220. The data processing system 200 may, optionally, include input device(s) 230 such as a keyboard or keypad, and a display 240 (illustrated in dashed times) that also communicate with the processor 210. The data processing system 200 may further include optional devices such as a speaker 250, and an I/O data port(s) 260 that also communicate with the processor 210. The I/O data ports 260 can be used to transfer information between the data processing system 200 and another computer system or a network. These components may be conventional components such as those used in many conventional data processing systems which may be configured to operate as described herein.

The processor 210 can be any commercially available or custom microprocessor. The memory 220 is representative of the overall hierarchy of memory devices containing the software and data used to implement the functionality of the data processing system 200. The memory 220 can include, but is not limited to, the following types of devices: cache, ROM, PROM, EPROM, EEPROM, flash memory, SRAM, and DRAM. The memory 220 may include several categories of software and data used in the data processing system 200: an operating system; application programs; input/output (I/O) device drivers; and data. As will be appreciated by those of skill in the art, the operating system may be any operating system suitable for use with a data processing system, such as OS/2, AIX or System390 from International Business Machines Corporation, Armonk, N.Y., Windows95, Windows98, Windows2000, Windows NT, Windows ME, Windows XP from Microsoft Corporation, Redmond, Wash., Unix or Linux. The I/O device drivers typically include software routines accessed through the operating system by the application programs to communicate with devices such as the I/O data port(s) 260 and certain memory 220 components. The application programs are illustrative of the programs that implement the various features of the data processing system 200 and preferably include at least one application which supports operations according to embodiments of the present invention. Finally, the data represents the static and dynamic data used by the application programs, the operating system, the I/O device drivers 260, and other software programs that may reside in the memory 220.

Referring now to FIG. 3, the operations that may be performed by a data processing system to change a password according to some embodiments of the present invention are illustrated. At block 300, a password change request is received. The password change request is associated with a requested password. The password change request may be generated by, for example, a user of the data processing system, or by a central password policy manager when, for example, a user's password has expired. At block 310, the password change request is transmitted to a central password policy manager. A decision is made at block 320 as to whether the requested password has been authorized according to shared password content policies. When the password change request is authorized, at block 330 a password in the local password registry of the data processing system is modified. In contrast, when the password change request is not authorized, for example as not compliant with the shared password content policies, at block 340 the local password registry may not be changed and a user may be notified on the non-authorization of the password change request.

Referring now to FIG. 4, the operations that may be performed by a central password policy manager to centrally manage the compliance of password change requests are illustrated. At block 400, a password change request is received from one of the data processing systems. At block 410, the requested password that is associated with the password change request is checked against the shared password content policies to determine whether the requested password is compliant with the policies and to provide authorization of the password change request to the respective one of the data processing systems.

Accordingly, passwords may be centrally managed according to shared password policies. Central management of passwords may provide more uniform levels of password strength among the data processing systems and may allow a user to request and/or change passwords in a more consistent manner irrespective or differences between the computers, software, and/or applications of the data processing systems.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method of controlling password changes in a system comprising:

utilizing a central password policy manager for controlling the contents of passwords for a plurality of data processing systems, each data processing system having its own local password controller that compares user-provided information to its own password registry to locally confirm the identity and associated authorization of users attempting to log on to the corresponding data processing system, the central password policy manager controlling the contents of passwords by:

receiving password change requests by the central password policy manager, wherein each password change request is received from across a network in response to the local password controller of an associated one of the data processing systems receiving a request for modification of a password that is stored in its password registry;

utilizing the central password policy manager to check compliance of each of the password change requests received from the local password controllers based upon shared password content policies; and returning an indication of compliance for each password change request received by the central password policy manager, to a corresponding one of the local password controllers, wherein, each local password controller modifies its associated password registry if authorized based on a corresponding returned indication of compliance from the central password policy manager.

2. The method of claim 1, wherein controlling the contents of passwords further comprises:

validating a requested password associated with a password change request from a respective one of the plurality of data processing systems utilizing the shared password content policies such that a corresponding returned indication of compliance comprises an authorization of the password change request to the respective one of the plurality of data processing systems.

3. The method of claim 2, wherein validating a requested password associated with a password change request comprises comparing a strength of the requested password associated with the password change request against one or more password strength rules.

4. The method of claim 2, wherein validating a requested password associated with a password change request comprises checking a format of the requested password associated with the password change request.

5. The method of claim 1, further comprising generating a notice to a user at one of the data processing systems based on the password compliance indication if the password change request did not comply with the password content policies.

6. The method of claim 1, further comprising providing password policy rules from the password content policies to a selected one of the data processing systems in response to receiving a password change request from that selected one of the data processing systems.

7. The method of claim 1, further comprising providing password policy rules from the password content policies to a selected one of the data processing systems in response to checking compliance of a corresponding password change request received from the selected one of the data processing systems against the password content policies.

8. The method of claim 1, further comprising:
providing a password synchronization manager that propagates a password change request that has been authorized by the central password policy manager to synchronize the corresponding password registries of multiple ones of the data processing systems.

9. A password management system comprising:
a central password policy manager for controlling the contents of passwords for a plurality of data processing systems, each data processing system having its own local password controller that compares user-provided information to its own corresponding password registry to locally confirm the identity and associated authorization of users attempting to log on to the corresponding data processing system, the central password policy manager configured to:
receive password change requests, wherein each password change request is received from across a network in response to the local password controller of an associated one of the data processing systems receiving a request for modification of a password that is stored in its password registry;
utilize shared password content policies to check compliance of each of the password change requests received from the local password controllers, and
return an indication of compliance for each password change request received by the central password policy manager to a corresponding one of the local password controllers, wherein each local password controller modifies its associated password registry if authorized based on a corresponding returned indication of compliance from the central password policy manager.

10. The password management system of claim 9, wherein the-local password controllers are configured to modify their associated password registry based on a received indication of compliance comprising an authorization from the central password policy manager upon validating a requested password associated with a password change request utilizing the shared password content policies.

11. The password management system of claim 9, wherein the plurality of local password controllers are further configured to generate a notice to a user if a received indication of compliance from the central password policy manager—indicates that a corresponding password change request did not comply with the password content policies.

12. The password management system of claim 9, wherein the central password policy manager is further configured to check compliance of a password change request by comparing a strength of a requested password associated with the password change request with password strength rules in the password content policies.

13. The password management system of claim 9 further comprising a password synchronization manager that propagates a password change request that has been authorized by the central password policy manager to synchronize the corresponding password registries of multiple ones of the data processing systems.

14. A computer program product for managing passwords, the computer program product comprising program code embodied in a computer-readable storage medium, the computer program code comprising:
program code for implementing a central password policy manager for controlling password changes in a system having a plurality of data processing systems, each data processing system having its own local password controller that compare user-provided information to its own password registry to locally confirm the identity and associated authorization of users attempting to log on to the corresponding data processing system, the program code for implementing the central password policy manager programmed for controlling the contents of passwords in the password registries for the plurality of data processing systems, having:
program code for receiving password change requests by the central password policy manager, wherein each password change request is received from across a network in response to the local password controller of an associated one of the data processing systems receiving a request for modification of a password that is stored in its password registry;
program code for utilizing the central password policy manager to check compliance of each of the password change requests received from the local password controllers based upon shared password content policies; and
program code for returning an indication of compliance for each password change request received by the central password policy manager, to a corresponding one of the local password controllers,
wherein each local password controller modifies its associated password registry if authorized based on a corresponding returned indication of compliance from the central password policy manager.

15. The computer program product according to claim 14, further comprising:
program code for validating a requested password associated with a password change request from a respective one of the plurality of data processing systems utilizing the password content policies to provide a corresponding indication of compliance comprising an authorization of the password change request to the respective one of the plurality of data processing systems.

16. The computer program product according to claim 14, further comprising program code for modifying a password in the password registry at one of the plurality of data processing systems when a requested password associated with a password change request from the respective one of the plurality of data processing systems complies with the password content policies.

17. The computer program product according to claim 14, wherein the program code for controlling password changes in a system having a plurality of data processing systems comprises program code for comparing a strength of a requested password associated with a password change request with password strength rules in the password content policies.

18. The computer program product according to claim 14, further comprising:
program code for providing a password synchronization manager that propagates a password change request that has been authorized by the central password policy manager to synchronize the corresponding password registries of multiple ones of the data processing systems.

* * * * *